United States Patent [19]

Rolstad et al.

[11] 4,298,430
[45] Nov. 3, 1981

[54] APPARATUS FOR DETERMINING THE LOCAL POWER GENERATION RATE IN A NUCLEAR REACTOR FUEL ASSEMBLY

[75] Inventors: Erik Rolstad; Thor-Harrald Korpas, both of Halden, Norway; Robert H. Leyse, Rockville; Robert D. Smith, Bethesda, both of Md.

[73] Assignee: Scandpower A/S, Kjeller, Norway

[21] Appl. No.: 888,881

[22] Filed: Mar. 21, 1978

[30] Foreign Application Priority Data

Mar. 23, 1977 [FR] France .............................. 77 08657

[51] Int. Cl.² .......................................... G21C 17/00
[52] U.S. Cl. ................................................ 376/247
[58] Field of Search ............. 176/19 R; 136/211, 212, 136/229, 233, 224–227, 230, 232; 73/1 F, 15 B, 359 R, 361; 250/390–393, 336, 395

[56] References Cited

U.S. PATENT DOCUMENTS

| | | | |
|---|---|---|---|
| 3,015,234 | 1/1962 | Springfield | 136/232 |
| 3,028,494 | 4/1962 | Wickersham et al. | 250/390 |
| 3,060,111 | 10/1962 | Sherman et al. | 176/19 R |
| 3,132,077 | 5/1964 | Turovlin | 176/19 R |
| 3,263,502 | 8/1966 | Springfield | 136/230 |
| 3,335,276 | 8/1967 | Chatelet et al. | 250/390 |
| 3,444,373 | 5/1969 | Obrowski et al. | 176/19 R |
| 3,511,091 | 5/1970 | Thome | 176/19 R |
| 3,716,417 | 2/1973 | Evans | 136/226 |
| 3,716,450 | 2/1973 | Lions | 176/19 R |
| 3,751,333 | 8/1973 | Drummond et al. | 176/19 R |
| 4,106,983 | 8/1978 | Meuschke et al. | 176/19 R |

OTHER PUBLICATIONS

Rev. Sci. Inst., vol. 29, No. 9 (9/58) Myers pp. 758–761.
Nuclear Radiation Detection, Price, 2nd Ed., (1964) McGraw Hill, Inc. pp. 302–307.

*Primary Examiner*—S. A. Cangialosi
*Attorney, Agent, or Firm*—Eric P. Schellin

[57] ABSTRACT

There is disclosed an elongated cylindrical rod of heat-conducting and electrically-conducting material having a central bore containing a plurality of thermocouples, the hot and cold junctions of which are placed respectively in separate zones along the rod. In each zone, the hot junction of one thermocouple is fixed generally in position axially at the midway of an annular reduced-section portion of the cylindrical rod, the cold junction is located generally axially between two reduced-diameter portions and an annular insulating chamber is defined annularly opposite to each reduced-diameter portion by an outer shielding tube. The outer tube surrounds the cylindrical rod. The completed unit is to be placed within a reactor core fuel assembly to be monitored.

15 Claims, 10 Drawing Figures

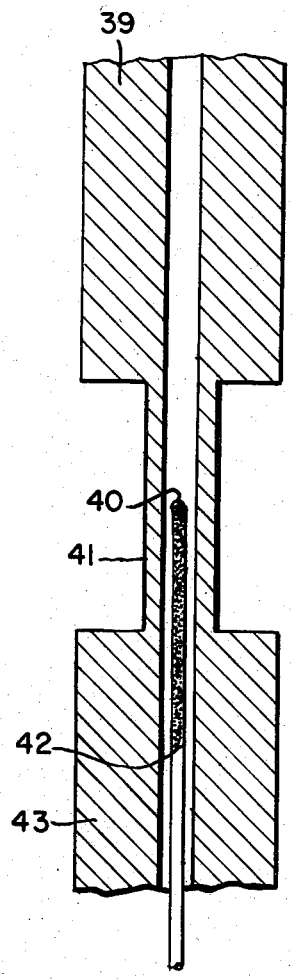
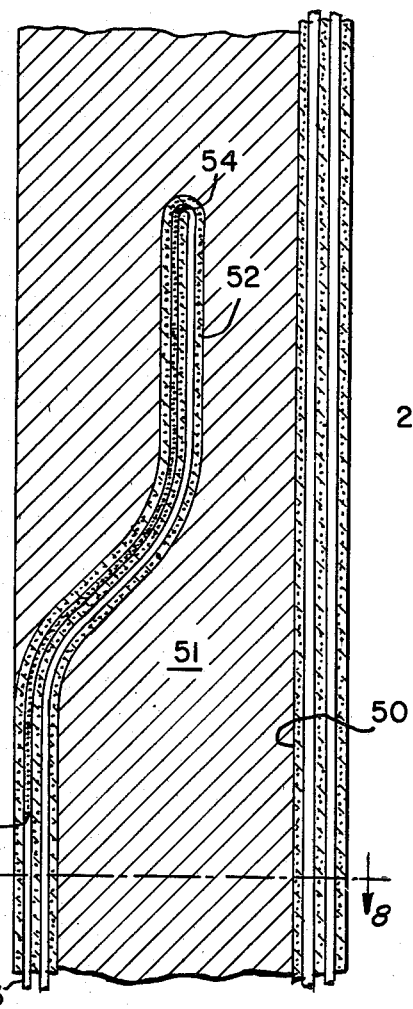
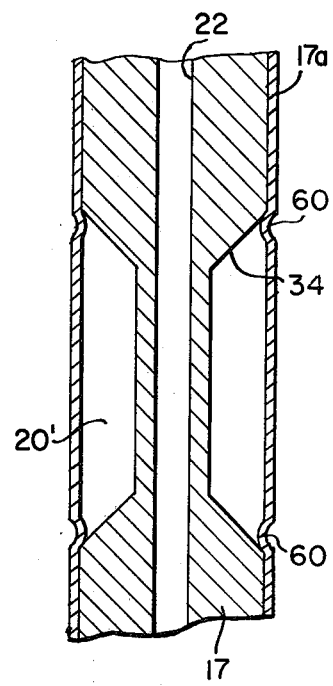
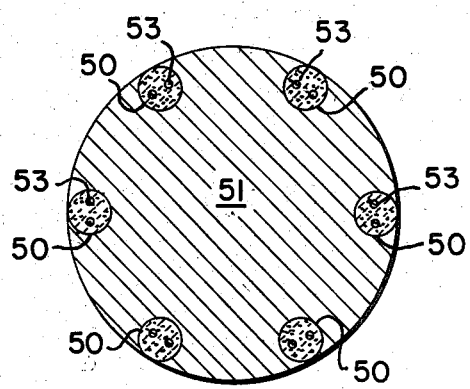
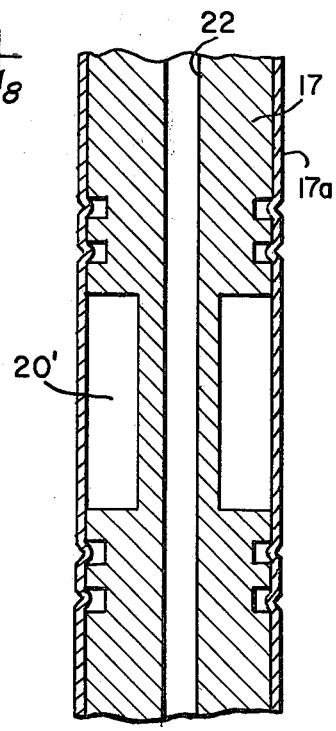

APPARATUS FOR DETERMINING THE LOCAL POWER GENERATION RATE IN A NUCLEAR REACTOR FUEL ASSEMBLY

BACKGROUND OF THE INVENTION

This invention relates to a device for local measurement of the quantity of power within the fuel of a reactor core fuel assembly. By making use of suitable means, the determination of this quantity at several axial positions in a fuel assembly and in several fuel assemblies serve to ensure reliable and efficient protection of fuel assemblies, therefore of the reactor core and of the entire nuclear power plant.

Many devices for the measurement of local power are already known. In general they are based on the principle of determination of the nuetron flux level in the immediate vicinity of the fuel and a known relationship is used for relating the value of this flux to the power output. Devices of this type which are particularly worth of mention are fission chambers, neutron detectors, neutron thermometers and collectrons. There is not a single instance, however, in which these instruments perform their intended function in a wholly satisfactory manner. The reason for this is that the signals delivered by the instruments are not usually proportional to the local power released by the fuel since they vary with the incident neutron flux. Determination of the power output consequently entails the need for cetain approximations in order to take into account both the reduction in cross-section of spent fuel and the reduction in strength of the signal emitter itself during the period of utilization of the instrument.

It has also been proposed to carry out local measurement of power output by means of instruments known as "gamma-ray thermometers" in which an increase in the temperature under measurement is brought about by exposure to electromagnetic radiation in the form of gamma rays, the proportion of which can attain 95%. Of these latter, approximately 70% result from fissions which have taken place during a time interval of the order of five minutes prior to measurement. In gamma-ray thermometers, the value of the temperature rise in a radiation-absorbing body can in fact be measured along a controlled and constant path provided for the removal of the heat produced. The laws of conduction accordingly show that the temperature difference measured on a given path of constant conductance through the body is proportional to the production of heat and consequently to the power released by the nuclear fuel located in its immediate vicinity as a result of fissions within said fuel.

In actual practice, however, gamma-ray thermometers have been employed up to the present time almost exclusively in heavy-water reactors. Their intended function in these reactors is to deliver signals which are proportional to the specific heat production without requiring any compensation for uranium depletion as the reactor operation proceeds or for loss of sensitivity of the measuring instrument. Moreover, these instruments have very high stability since gamma-ray absorption is dependent solely on the density of the radiation-absorbing body and is not affected by variations arising from modifications of the atomic or isotopic structure which characterize other types of detector. In this case the effect produced by the neutron flux on the material has a negligible consequence in regard to the properties which determine the absorption of gamma rays and the resultant temperature rise.

However, gamma-ray thermometers of the type which have been designed up to the present time, especially for heavy-water reactors, are adapted only to point-measurement powers expressed in mW/g. As a general rule, these instruments make use of an absorbent metallic mass mounted within a protective sheath, the sheath being placed among the fuel elements within the reactor core. A first portion of the metallic mass is in contact with the sheath and the external environment and is substantially at the temperature of this latter while a second portion is connected to the first but located within an insulated chamber, the space between the second portion and the sheath being filled with a gas or air or even evacuated. The device thus forms a heat sink in which the temperature difference between the two portions of the absorbent mass can be measured by means of thermocouples. After calibration, the absorbed thermal power and therefore the power released by the surrounding nuclear fuel can be deduced from a knowledge of the geometrical characteristics of the absorbent mass. However, gamma thermometers up to the present time have been calibrated by only indirect means. For example, it is known that in one application the gamma thermometers are cross-calibrated with neutron flux measurement at the same location. In another situation, gamma thermometers have been calibrated by measurement of transient thermal response outside of the nuclear reactor. It is presently unknown to calibrate either in situ or ex-situ of the reactor by utilizing the Joule effect of applied electrical current.

One of the objects of the present invention is to permit the practical construction of a gamma-ray thermometer array for use in gamma fluxes of appreciably higher value than those encountered in heavy-water reactors. Such a system can be employed, for example, in light-water reactors and even in fast reactors while permitting measurement of the linear power released by the fuel which is usually measured in W/cm.

A further object of the invention is to permit a sufficient degree of miniaturization of the gamma-ray thermometer array under consideration by virtue of the substantially higher rates of temperature rise in a light-water reactor. Thus the system can be mounted within a sheath of very small diameter and of substantial length. Said sheath can be introduced among the bundle of canned fuel pins of a fuel assembly which is employed in the usual manner in a reactor of this type (fuel pins each having a diameter between 8 and 10 mm and a length of 4 m).

Yet another object of the invention is to permit accurate and reliable measurement which is not subject to any appreciable drift in the course of time and is therefore particularly reliable; this measurement can be performed in a series of separate and distinct zones disposed successively in the vertical direction along the entire length of the fuel assembly.

Still another object of the invention is to permit the construction of a gamma-ray thermometer array which is adapted to undergo accurate calibration prior to mounting within the reactor core. Such calibration being carried out by means of a system would produce heat generation that would simulate the power that would be produced in the fuel which simulates the power released by the fuel.

One more object of the invention is to permit mechanical tuning i.e. adjustment, of the gamma ray thermometer system remote from the reactor. Such mechanical tuning being carried out by means which fix the calibration to be within pre-selected desired standards.

As mentioned earlier, the principle adopted in order to carry out the measurement by means of a gamma-ray thermometer consists in very general terms in establishing a path having a constant and predetermined value of heat conductance in the mass of a gamma-absorbing body and, after calibration, in deducing from the temperature recorded at the ends of said path the value of the heat which is produced in the body by absorption of the gamma radiation released by the power production in the surrounding nuclear fuel and therefore produced by the surrounding nuclear fuel.

With these objectives, consideration has been given to a number of configurations defining a specific path for the flow of heat produced, reducing the effectiveness of or by eliminating the secondary or alternate thermal paths which would reduce or impair the accuracy of measurements to an appreciable extent. Thus, the most simple expedient consists in making use of a solid cylindrical radiation-absorbing body comprising a first thermocouple located axially and a second thermocouple located axially internally of a greater mass or at the periphery thereof. Since heat flows radially, the temperature difference measured between these thermocouples is proportional to the square of the radius of the transverse section of said solid cylinder and to the production of heat within the corresponding mass and is inversely proportional to the thermal conductivity of the body. However, the constructional design just mentioned cannot be adopted in practices since the measured temperature difference Delta t is not large enough to permit a really significant measurement within the dimensional limits permitted in the case of an arrangement within the bundle of pins of a fuel assembly, especially in a nuclear reactor of the pressurized-water type. Other design solutions derived from the preceding can also be contemplated with a view to guiding the flow of radial heat in a more effective manner. This is achieved by making provision within the radiation-absorbing body for a cavity in which are formed one or a number of insulating chambers between the central region and the peripheral region, these regions being connected to each other by means of at least one radial arm. While they do have the effect of increasing the measured temperature difference as a result of the higher resistance to heat transfer which is due to the present of the aforementioned insulating chamber, these design solutions still fall short of the standard of efficiency required to justify their adoption in a pressurized-water reactor and even in a fast reactor.

This invention relates to an improvement in the constructional arrangements recalled in the foregoing and accordingly makes it possible to obtain a measurement corresponding to an appreciable temperature difference. Furthermore all the objectives which have been stated in the foregoing are achieved by means of the device under consideration.

BRIEF DESCRIPTION OF THE INVENTION

Accordingly, the device of the present invention comprises an essentially operatively unitary cylindrical rod of substantial elongated length which is formed of heat-conducting and electrically-conducting material and provided with a central bore containing a series of thermocouples so arranged that the cold and hot junctions respectively between which each measurement is carried out are placed in separate and distinct zones along the longitudinal dimension of the cylindrical rod. In each zone, the rod has an annular reduced-diameter portion extending over a distance which has been predetermined. The hot junction of one thermocouple is fixed in position at the mid-length of said portion and between two reduced-diameter portions in two successive zones. In the preferred embodiment the outer shielding tube surrounds the rod and thereby defines an annular insulating chamber opposite to the reduced-diameter portion in each zone.

By virtue of these arrangements, the flow of heat which is produced by absorption of gamma radiation in the cylindrical rod and which normally takes place in the radial direction is caused to take place substantially in the axial direction at the level of each measurement zone and along the length of the reduced-diameter portion which is surrounded by an annular chamber. The temperature difference is determined at the level of each of these zones by means of two thermocouple junctions consisting respectively of a hot junction at substantially the midpoint of the reduced diameter portion and a cold junction in the adjacent full diameter section of the rod.

The choice of a material which is not only heat-conducting but electrically-conducting, for the purpose of forming the cylindrical rod, also permits calibration of the system. This may be accomplished by connecting the ends of said rod to a source of electric current. The flow of electricity produces a predetermined heat output due to the known value of electrical resistance of the rod. By modifying the length of the reduced-diameter portions of the cylindrical rod at the time of manufacture or, in other words, by modifying the length of the annular chambers formed between the rod and the outer shielding tube, it is thus possible to determine the adjacent temperature difference for a given value of heat generation in the rod. As a result of such calibration, during reactor operation, the heat generation rate can be instantaneously deduced from the temperature difference.

The cylindrical rod is preferably formed of stainless steel and especially of the grade designated as 304L. By way of alternative, said rod can be of aluminum, of tungsten or of any other metal or alloy which is suited to the operating conditions. As a further alternative, the cylindrical rod can be made of conductive ceramic material. Similarly, the outer shielding tube can be formed of zircaloy, of steel, or of any other suitable metal or alloy.

In a first embodiment of the invention, the outer shielding tube is constituted by a sheath which serves to receive the cylindrical rod and is placed within a fuel assembly to be monitored, said cylindrical rod being introduced into said tube and remains in position during reactor operation. In this case, height adjustment of the annular chambers is performed as a result of accurate machining of the length of each reduced-section portion of the cylindrical rod after accurate localization of the position of the hot junction of the thermocouple with respect to the center of said portion.

In another alternative embodiment, the outer shielding tube is so designed as to be rigidly fixed by suitable means to the cylindrical rod, the annular chambers defined between the rod and the tube being filled with an insulating gas or evacuated, thus achieving enhanced axial heat transfer through the reduced-section portions of the rod in the different measurement zones. The method for bonding the tube to the rod may be any conventional bonding means such as swaging through appropriately dimensional dies, rotary heat welding, longitudinally spaced circumferential radial pressure means at localized annular areas, etc.

In another alternatuve embodiment, the cylindrical rod is provided with a conical chamber at the ends of each chamber which permits suitable deformation of the tube in order to limit the size of the chamber and also to assist, if necessary, in securing the tube to the rod.

In accordance with another distinctive feature of the measuring device under consideration, the thermocouples contained in the central passage of the cylindrical rod are differential thermocouples consisting of two sheathed wires arranged in a hairpin loop and formed of a first conductive material. The two wires are connected to each other by means of an intermediate portion of a second conductive material. The connections between these conductors are of different but conventional materials whereby they operate as the junctions of the thermocouple. As an advantageous feature, the thermocouple wires are respectively formed of Chromel or of Alumel and are placed within a protective sheath of Inconel with interposition of an electrical insulating material of alumina, of magnesia or of any other insulating material between the sheath and the wires, generally of an inorganic nature.

In accordance with yet another distinctive feature, the thermocouples are generally distributed within the central passage of the cylindrical rod around a central positioning and centering rod or tube each thermocouple sheath being extended beyond the corresponding measurement zone along the entire length of the central passage. It found desirable the centering means when it is a tube may have located therein one or more heat sensing means.

In yet another embodiment the cylindrical rod is essentially an undiminished solid throughout. Elongated outer grooves are provided designed to carry the junction thermocouples and their necessary electrical leads. The cold junctions are positioned in spaced relationship along the rod. The corresponding hot junction is carried into a central axial position by means of drilled taps to produce an inclined bore terminating at the axis of the rod. These terminals are in spaced relationship between the cold junctions in the aforesaid manner.

DESCRIPTION OF THE DRAWINGS

Further distinctive features and advantages of a device for measuring local power within a nuclear reactor fuel assembly will become apparent from the following detailed description of exemplified embodiments which are given by way of illustration without any limitation being implied, reference being had to the accompanying drawings, wherein:

FIG. 6 is a sectional fragmentary view as in FIG. 2 of another embodiment of the present invention;

FIG. 7 is a sectional view of still another embodiment;

FIG. 8 is a cross-sectional view taken along line 7—7 of FIG. 7;

FIG. 9 is a sectional fragmentary view of another embodiment; and

FIG. 10 is a sectional fragmentary view of still another embodiment.

DETAILED DESCRIPTION OF THE VARIOUS EMBODIMENTS OF THE INVENTION

Figure 1:
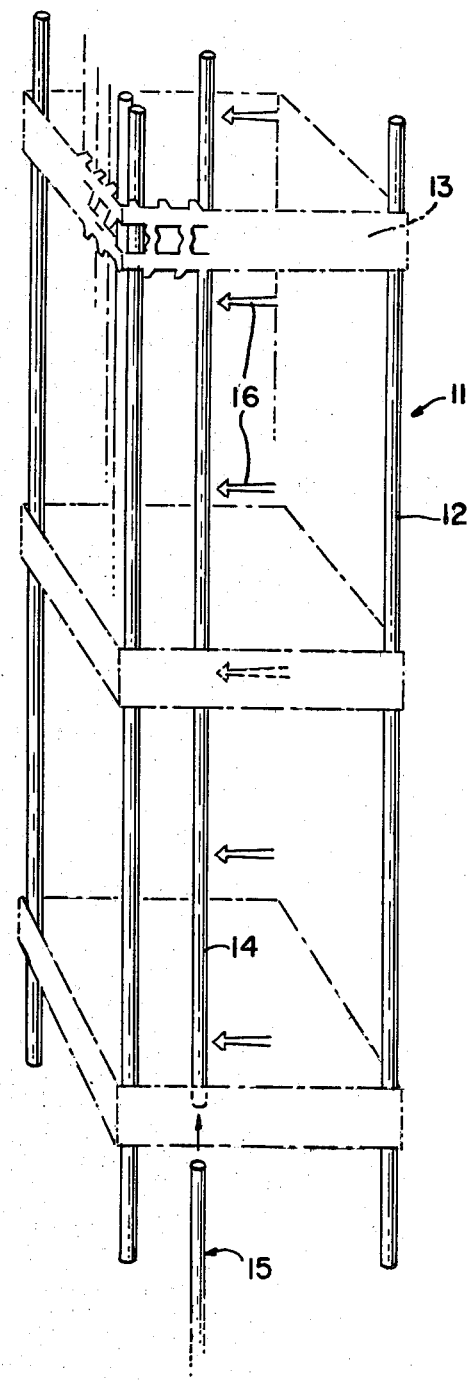
FIG. 1 is a diagrammatic view in partial perspective showing a nuclear reactor fuel assembly fitted with a measuring device in accordance with the invention.

In the perspective view of FIG. 1, the reference numeral 11 designates schematically a fuel assembly structure for a nuclear reactor and especially a reactor of the light-water type. The fuel assembly comprises in known manner a series of canned fuel pellets 12 in uniformly spaced relation, hereinafter designated as fuel pins. The geometry of the lattic on which said pins are disposed is maintained by means of space grids 13 which are mounted within the fuel assembly at uniform intervals.

In accordance with the invention, the bundle of fuel pins 12 is provided at a suitably determined lattice location with a shielding tube 14 for the introduction of the measuring device 15 which is fitted in position within said tube, especially at the lower end thereof. Said device 15 makes it possible to carry out a local measurement of the power released by the surrounding fuel pins at different levels within the assembly, these levels being indicated in the drawing by means of a series of arrows 16, for instance.

Figure 2:
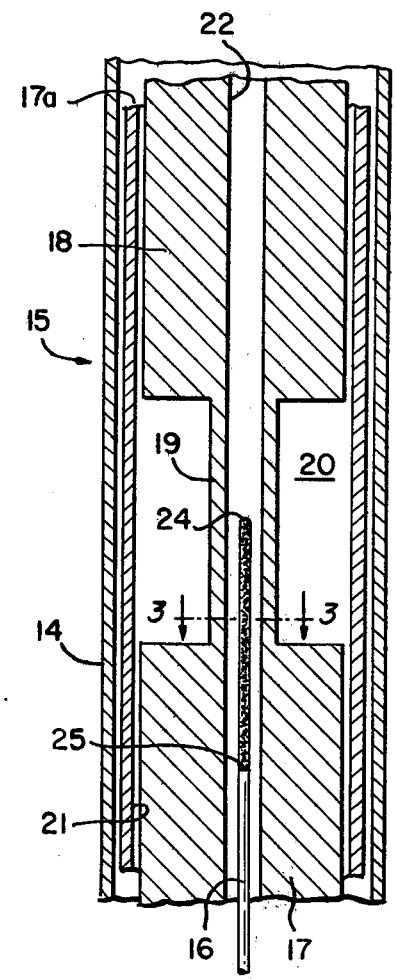
FIG. 2 is a sectional view to a larger scale.

As illustrated at a larger scale in FIG. 2, the measuring device 15 is the gamma-ray thermometer assembly under consideration which comprises a cylindrical rod 17 of relatively small diameter and substantial length formed of material having good heat conductivity and good electrical conductivity and preferably formed of metal such as stainless steel, for example, or of an alloy or of suitable conductive ceramic material, and a tube 17a for shielding the cylindrical rod 17 which is inserted in said tube 17a.

The above-mentioned cylindrical rod 17 which is of substantial length is thus capable of extending to the full height of the outer shielding tube 14 within the fuel assembly 11 and is provided with reduced radial portions 19. Once the cylindrical rod is placed in position within said tube 14, said reduced-section portions 19 are located at the level of the aforementioned zones at which power measurements are intended to be taken as represented by the arrows 16 in FIG. 1. These portions are surrounded by annular chambers 20 defined between said portions 19 and the internal wall of the tube 17a in the example of construction shown in the drawings. The cylindrical rod 17 is introduced into the interior of the tube 17a with allowance for a clearance space 21 and is thus capable of displacement in sliding motion within this space for either positioning or withdrawal. It is also contemplated that tube 17a may be secured to the normal non-reduced portion of the rod 17 in a fluid tight manner whereby the chamber 20 may be either charged with a gas or may be evacuated to enhance the insulating qualities of the said chambers.

Also in accordance with the invention, the cylindrical rod 17 has a longitudinal axial bore 22 which extends to the full length of said rod. A plurality of thermocouples are positioned therein exemplified by such as the thermocouple 23; the constructional arrangement of which will be described in detail hereinafter. Each thermocouple of aforesaid is associated with one of the measurement zones designated in FIG. 1 by the arrows 16 along the length of the tube 14, with the result that a hot thermocouple junction 24 is placed substantially at the mid-section of each reduced-section portion 19 and a cold junction 25 is placed beyond the end of the corresponding chamber 20 within the normal-section portion 18 of the cylindrical rod 17, i.e. non-reduced portion.

During reactor operation, the gamma radiation produced by the fissioning nuclear fuel in the pins 12 which surround the measuring rod 17 is absorbed by the mass of the rod 17 and produces a temperature rise. The heat thus generated normally flows conductively radially through each portion of the rod 17 except in the regions 19 of small section. The heat flow takes place radially as a result of the presence of the annular insulating chambers 20. Under these conditions, it is possible to measure a temperature difference Delta t between the hot junction 24 and the cold junction 25 of each thermocouple 23, generally. When the dimensions of the portion 19 and the heat conductivity of the material constituting the cylindrical rod 17 are known, the quantity of heat g produced and absorbed by said rod 17 can accordingly be deduced from the temperature difference aforesaid in accordance with formula (1) as given hereunder:

$$g = (4K \cdot \Delta t)/L^2 \qquad (1)$$

where

L represents one-half the length of the portion 19 and
K represents the heat conductivity of the material of cylindrical rod 17.

Figure 3:
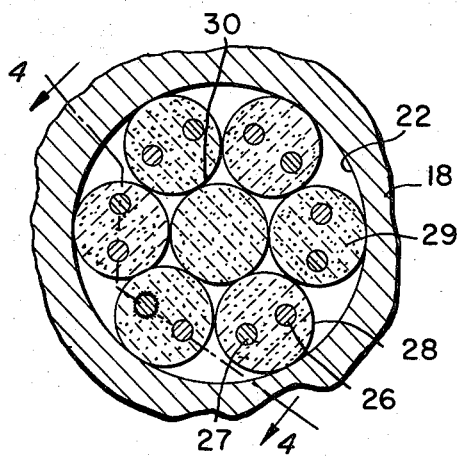
FIG. 3 is a sectional fragmentary view at an even larger scale along line 3—3 of FIG. 2.

FIG. 3 is a sectional view of the rod 17 of the measuring device as shown in a larger scale, especially in the region of its central bore 22 in which the thermocouples 23 are distributed. In the example of construction shown in this figure, provision is made for six thermocouples placed against the internal cylindrical wall of the centrally disposed bore 22. Although it is contemplated that the number of thermocouples may be more or less than 6 as found desirable. Each thermocouple is constituted of two conductors 26 and 27 respectively, said conductors being formed of Chromel, for example, and surrounded by an outer protective sheath 28 of Inconel. The region located between said sheath and the conductors 26 and 27 is filled with inorganic insulating material 29 usually consisting of alumina, magnesia or any other electrical insulating material. Once they have been mounted within the central bore 22, the six thermocouples are annularly centered within bore by means of a central rod 30 which permits both correct positioning and immobilization of these thermocouples while at the same time achieving enhanced radial heat transfer.

Figure 4:
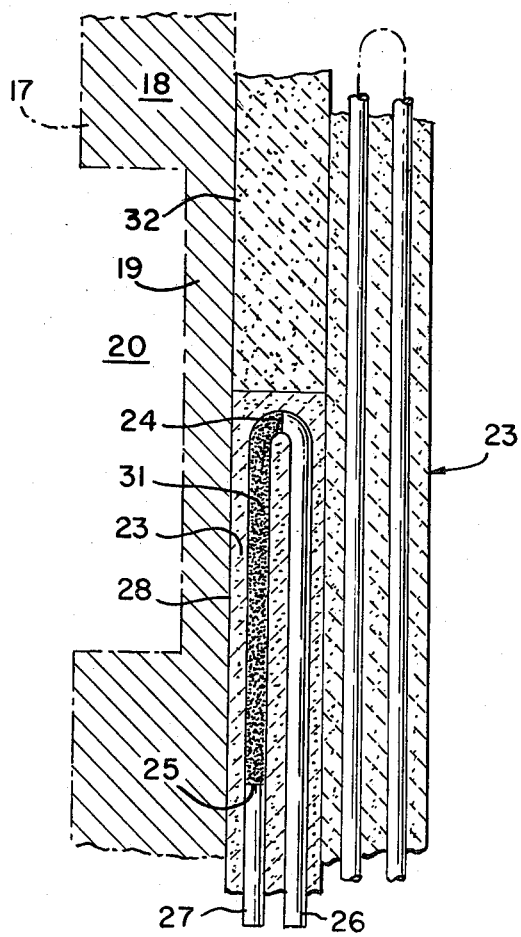
FIG. 4 is a sectional fragmentary view taken along line 4—4 of FIG. 3.

As shown in greater detail in FIG. 4, the conductors 26 and 27 of each thermocouple 23 which are formed of Chromel are connected to each other by means of an intermediate portion 31 of another material usually consisting of Alumel. The welded junctions of these conductors constitute respectively the hot junction 24 and cold junction 25 for carrying out the measurement in the manner indicated earlier. As can be seen especially in FIG. 4, the hot junction 24 is placed at the center of the annular chamber 20 whilst the cold junction 25 is located outside said chamber and positioned in the normal-section zone of the cylindrical rod 17 in which the temperature is substantially uniform at all points. It should be noted that the sheath 28 of each thermocouple is extended to the full height of the central bore 22, especially beyond the hot junction 24, by means of a portion 32 which is also of Inconel and is supplied with an appropriate filler material. For efficiency of both calibration and operation the cold junction should be closer to the reduced size portion carrying the corresponding hot junction than to the further displaced reduced size portion.

In the examples of construction described in the foregoing, the measuring device in accordance with the invention is mainly constituted of a cylindrical rod 17 provided with portions 19 of reduced section at those locations in which measurements are intended to be taken in the fuel assembly. The device as a whole in the outer shielding tube 17a is slidably mounted within the tube 14 of the bundle of fuel pins.

Figure 5:
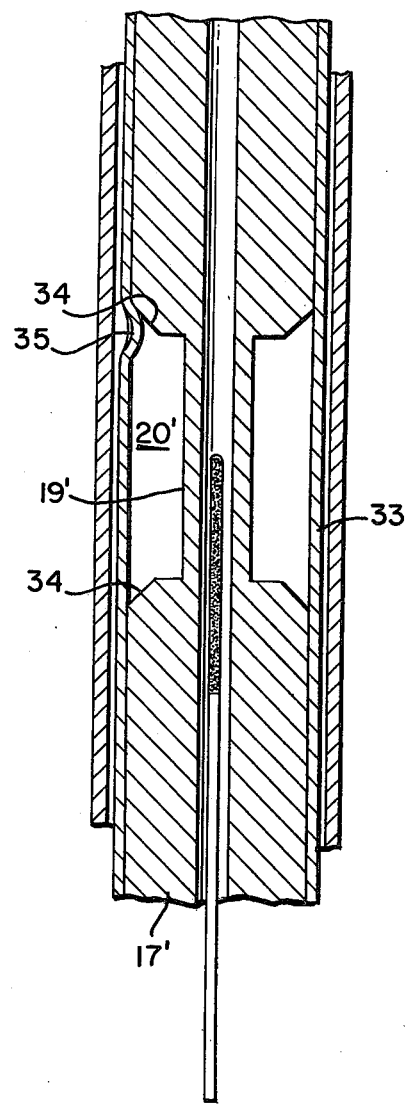
FIG. 5 is a sectional fragmentary view similar to FIG. 2 but relates to an alternative embodiment.

In another alternative embodiment which is illustrated in FIG. 5, the cylindrical rod 17' is provided as in the previous instance with portions 19' of smaller section defining annular chambers 20'; and is so designed as to be surrounded by a shielding tube 33. Said tube is mounted on the cylindrical rod at the time of assembly of the device and prior to introduction thereof into the interior of the tube 14 within the fuel assembly. In this alternative embodiment, immobilization of the shielding tube 33 with respect to the cylindrical rod 17' is achieved by forming conical chamfers 34 at the ends of the chambers 20'. Said chamfered end portions are capable of cooperating with one or a number of dimples 35 formed in the external surface of the tube 33 which may extend annularly. The suitable position of said dimples 35 is chosen so as to adjust to a desired length of the path for the flow of heat between the cold junctions of the thermocouples and externally of the rod, i.e. at its circumference. Accordingly, the concept of "tunning" the device of the present invention is accomplished. More about this will be taught below.

Now turning to FIG. 6 for a consideration of another embodiment, it is submitted that the tube 17a of FIG. 2, for instance, has been eliminated. In this embodiment a fluid coolant is employed to flow over the cylindrical rod 39. Under such conditions, the temperature at thermocouple 40 within the reduced diameter 41 is colder than the temperature at the thermocouple 42 which is positioned within the normal diameter portion 43 of the cylindrical rod 39.

In yet another embodiment, as depicted by FIGS. 7 and 8 the central bore 22 and reduced diameter portions 19 are eliminated. Instead a plurality of axial grooves 50 are positioned along cylindrical rod 51. Appropriately sheathed conductors 53 with their appropriate thermocouples are positioned in the grooves. The hot junction 54 of each thermocouple is positioned axially centrally of the rod through an inclined bore 52. The cold junction 55 is positioned along the circumference of the cylindrical rod in one of the said grooves. In this embodiment direct coolant flow is permitted over the cylindrical rod.

The constructional arrangements set forth in the foregoing embodiments permit a considerable reduction in the dimensions of the gamma-ray thermometer. Thus the normal external diameter of the measuring rod employed is such as to permit engagement thereof with the shielding tube 17a or 33 which is slidably mounted within the guide tube 14. Said tube in turn is mounted within the fuel assembly 11 among the fuel pins 12 of the bundle and has an external diameter which does not exceed that of said fuel pins. Moreover, the distribution of the thermocouples along the length of the measuring rod makes it possible to determine the thermal power output from point to point and consequently to deduce by immediate measurement the value of the local power generation produced within the fuel of the fuel pins which are in proximity to the cylindrical rod.

In order to permit the determination of local power generation just mentioned, however, the device must undergo calibration prior to assembly within the guide tube 14, for instance. In accordance with the invention, this can readily be achieved by reason of the electrically conductive nature of the cylindrical rod 17 and 17' which is accordingly connected to a current source (not shown in the drawings). Since the electrical resistivity and geometry of said rod is known, a suitable quantity of heat generation can be produced electrically and the temperature difference thus set up can be measured at the location of the thermocouples. By virtue of this calibration, it is then possible during operation to deduce from the value of the observed temperature difference, the best generated by absorbtion of gamma rays and consequently the power being generated in surrounding fuel. If so required, a similar calibration can be performed after mounting the thermometer within its shielding tube.

Attention is now directed to FIGS. 9 and 10 for a return to the discussion involving a particularly unique feature of the present invention, i.e. the concept pertaining to tuning the assembly to fit particular patterns. This concept of tuning may be achieved in a plurality of ways. One manner involves diminishing the radial flow path from the center bore 22 to the fixed shielding tube 17a. In FIG. 9 this is accomplished by employing the rod of FIG. 5 with conical chamfers and annularly deforming the shielding tube 17a against the chamfers 34 to produce an annular depression 60 to thereby alter the effective length of the heat path from the midplane of chamber 20" and thereby alter the temperature difference measured by the thermocouple for a given rate of gamma heat generation. The amount of contact may be varied on either one end of the chamber 20" or on both ends. It has been found that the degree of contact need not be uniform over the circumference. The degree of contact can also be varied by one or several dimples on one or both of the chamfered surfaces.

In FIG. 10 mechanical tuning of the detector chamber is achieved by varying the amount of contact between the cylindrical rod 17 and the tube 17a. The cylindrical rod 17 has one or more grooves machined into the non-reduced portion of the rod near the said chamber. Tube 17a is then deformed into said grooves or may merely be dimpled thereinto to produce a knurled effect.

Of course, it is possible to establish desirable parameters in tuning the apparatus of the present invention by selecting a particular size for the chambers, i.e. enlarging the chamber or diminishing their size.

It should finally be noted that, tuning may be achieved by appropriately selecting the composition of the substance in the chambers. The annular chambers which surround the portions of smaller section and at the center of which are placed the hot junctions of the thermocouples can either be filled with a suitable gas or evacuated at the time of assembly. The latter accordingly improves the degree of heat insulation achieved by said chambers as well as the axial flow of heat along said portions of smaller section. On the other hand it may be desirable to increase the heat leakage by employing a gas. Nitrogen will, for example, give higher heat leakage across the chamber than krypton. A gas such as helium or hydrogen will have a difference thermal conductivity from that of krypton, for instance.

Finally, it is taught that a combination of any of the disclosed tuning methods may be employed without departing from the spirit of the invention. As can readily be understood, the invention is not limited to the examples which have been more especially described in the foregoing but extends on the contrary to all alternative forms. In particular, it is worthy of note that not specification has been given in regard to the connection of the thermocouple wires to an external measurement and monitoring unit for processing the signals obtained. A unit of this type can be adapted to the requirements of utilization and operating conditions.

We claim:

1. A device for measuring local power generation rate within neighboring fuel pins of a nuclear reactor core fuel assembly by generating signals from gamma heating which can be calibrated by direct electrical resistance heating over the entire range of in-reactor gamma heat rates, said device comprising:
   (a) an elongate body having a longitudinal axis formed of heat-conducting and electrically-conducting material whereby said elongate body is capable of being subjected to controlled direct electric resistance heating during calibration, said elongate body being heated by any ambient gamma ray flux;
   (b) a plurality of gamma thermometer zones distributed along the axis of the elongate body;
   (c) each gamma thermometer zone including adjacent portions of said body spaced along the axis thereof, one portion being provided with circumferential heat insulating means to inhibit heat conduction in a direction radial to said axis between said one portion and the ambience, the adjacent portion having no means to inhibit radial heat conduction, whereby the first portion rejects gamma ray flux induced heat to the ambience principally by one-dimensional heat flow longitudinally along the elongate body from the said one portion to said other portion, while said other portion rejects heat to the ambience principally by heat flow radially of the axis of said elongated body from the said other portion to the ambience, each said gamma thermometer also having a pair of thermocouple junctions positioned to measure the temperature difference across a substantially one-dimensional heat flow path between said first portion and said second portion;
   (d) whereby the power generated in the neighboring nuclear fuel surrounding each said zone can be deduced from signals indicative of said temperature difference.

2. A device for measuring local power generation rate within a nuclear reactor fuel assembly comprising:
   (a) a cylindrical rod having a plurality of regions of substantially constant diameter, said rod being formed of heat conducting and electrically conducting material, said material being heated by any ambient gamma ray flux;
   (b) said cylindrical rod having a central bore;
   (c) said bore containing a plurality of differential thermocouples having cold and hot junctions;

(d) said rod being provided, between said regions of substantially constant diameter, with a plurality of zones of reduced diameter;

(e) a hot junction of one differential thermocouple being operatively positioned in said central bore midway of said zone of reduced thickness;

(f) the corresponding cold junction of said differential thermocouple being operatively positioned in said central bore between two successive zones of reduced thickness and spaced from the junctions between said two successive zones and the intervening region of substantially constant diameter;

(g) said cylindrical rod being secured in a relatively closely fitting shielding tube having an inner wall whereby an annular heat insulating chamber is defined by said zone of reduced diameter and the inner portion of said inner wall;

(h) whereby, when said cylindrical rod is heated by a longitudinal electric current or by an ambient gamma ray flux, the heat developed therein is rejected to the ambience; and (i) whereby the heat conduction within said rod, in a zone of reduced diameter, is substantially in the axial direction and the heat conduction within said rod, in that portion of one of said regions of substantially constant diameter within which a cold junction is situated, is substantially in the radial direction.

3. The device according to claim 2, wherein the cylindrical rod is formed of stainless steel.

4. The device according to claim 2, wherein the cylindrical rod is formed of aluminum.

5. The device according to claim 2, wherein the cylindrical rod is formed of conductive ceramic material.

6. The device according to claim 2, wherein the outer shielding tube is so designed as to be rigidly fixed to the cylindrical rod, the annular chambers defined between said rod and said tube being filled with an insulating gas or evacuated.

7. The device according to claim 2, wherein the thermocouples contained in the central bore of the cylindrical rod are differential thermocouples constituted by two sheathed wires arranged in a hairpin loop and formed of a first conductive material, said two wires being connected to each other by means of an intermediate portion of a second conductive material, the connections between these conductors of different nature being intended to constitute the junctions of the thermocouple.

8. The device according to claim 6, wherein the thermocouple wires are respectively formed of Chromel or of Alumel and are placed within a protective sheath of Inconel with interposition of an electrical insulating material selected from the group consisting of alumina and magnesia.

9. The device according to claim 2, wherein the thermocouples are distributed within the central passage of the cylindrical rod around a central positioning and centering rod.

10. The device according to claim 6, wherein the sheath of each thermocouple extends beyond the corresponding measurement zone along the entire length of the central bore.

11. The device according to claim 1, wherein the thermocouple junctions include a cold junction and a hot junction, the cold junction is positioned in cavity means at the periphery of said elongated body and the hot junction is positioned substantially centrally internally of said elongate body.

12. A device for measuring local power generation rate within a nuclear reactor fuel assembly comprising:

(a) a cylindrical rod being formed of limited heat conducting material, to provided a temperature drop along a path of heat flow, and electrically conducting material and being of substantially constant diameter;

(b) said cylindrical rod having a central bore;

(c) said bore containing a plurality of differential thermocouples, each having first and second junctions;

(d) said rod being provided with a plurality of zones of reduced diameter spaced along said rod and separated by zones having said substantially constant diameter;

(e) first junction of one of said differential thermocouples being operatively positioned in said central bore midway of one of said zones of reduced diameter;

(f) the corresponding second junction of said one thermocouple being operatively positioned in said central bore at a location in a zone of said substantially constant diameter between said zone of reduced diameter and the next successive zone of reduced diameter but remote from the junctions between said zone of substantially constant diameter and said zones of reduced diameters; and (g) a cylindrical jacket of approximately constant inner and outer diameter encasing said cylindrical rod and in intimate contact with said zones of substantially constant diameter.

13. The device according to claim 2, wherein the cylindrical rod is formed of tungsten.

14. The device according to claim 2, wherein the cylindrical rod is formed of metal.

15. The device according to claim 2, wherein the cylindrical rod is formed of metal alloy.

* * * * *